US 8,478,264 B2

(12) United States Patent
Sekino

(10) Patent No.: US 8,478,264 B2
(45) Date of Patent: Jul. 2, 2013

(54) WIRELESS COMMUNICATION SYSTEM

(75) Inventor: Hiroyuki Sekino, Tokyo (JP)

(73) Assignee: Azbil Corporation, Tokyo (JP)

( * ) Notice: Subject to any disclaimer, the term of this patent is extended or adjusted under 35 U.S.C. 154(b) by 140 days.

(21) Appl. No.: 13/209,853

(22) Filed: Aug. 15, 2011

(65) Prior Publication Data

US 2012/0052805 A1    Mar. 1, 2012

(30) Foreign Application Priority Data

Aug. 31, 2010   (JP) .................................. 2010-193531

(51) Int. Cl.
*H04W 4/00*    (2009.01)
*H04B 7/00*    (2006.01)
*H04L 12/28*   (2006.01)
*G06F 7/00*    (2006.01)
*G06F 15/16*   (2006.01)

(52) U.S. Cl.
USPC ............. 455/426.2; 455/422.1; 455/41.2; 370/389; 370/338; 709/208; 709/209; 707/623

(58) Field of Classification Search
USPC ... 455/426.2, 422.1, 41.2, 434, 514; 370/338, 370/389, 423; 707/623; 709/203, 208–211, 709/218, 250
See application file for complete search history.

(56) References Cited

U.S. PATENT DOCUMENTS

| | | | | |
|---|---|---|---|---|
| 7,746,834 | B1 * | 6/2010 | Moore et al. | 370/338 |
| 2002/0107859 | A1 * | 8/2002 | Tsuyuki | 707/100 |
| 2002/0178236 | A1 * | 11/2002 | Patel et al. | 709/218 |
| 2003/0065440 | A1 * | 4/2003 | Oda et al. | 701/202 |
| 2004/0141511 | A1 * | 7/2004 | Rune et al. | 370/401 |
| 2005/0216724 | A1 * | 9/2005 | Isozaki et al. | 713/150 |
| 2006/0171321 | A1 * | 8/2006 | Kim | 370/241 |
| 2007/0120953 | A1 * | 5/2007 | Koga et al. | 348/14.01 |
| 2009/0213848 | A1 * | 8/2009 | Jeon et al. | 370/389 |
| 2010/0008169 | A1 * | 1/2010 | Kim et al. | 365/194 |
| 2010/0013760 | A1 * | 1/2010 | Hirai et al. | 345/156 |

FOREIGN PATENT DOCUMENTS

JP    2006-5928 A    1/2006
JP    2006-42370 A   2/2006

* cited by examiner

*Primary Examiner* — Dominic E Rego

(74) *Attorney, Agent, or Firm* — Troutman Sanders LLP

(57) ABSTRACT

In a master device, an address for a transmission origin and an address of an ultimate transmission destination, included in a message from an end device, are stored, as a pair, as proxy information, and the address of the transmission origin included in the message is overwritten with the local communication address, to form a proxy message to the destination device. Moreover, the master device performs a search for a round-trip route to the destination device and sends the proxy message to the destination device following the outbound route that has been searched. The destination device, upon receipt of a proxy message, sends back a message to the master device following the inbound route that has been searched by the master device. The master device uses the proxy information to send back, to the end device, the message from the destination device.

3 Claims, 7 Drawing Sheets

WIRELESS COMMUNICATION SYSTEM

CROSS REFERENCE TO RELATED APPLICATIONS

The present application claims priority under 35 U.S.C. §119 to Japanese Patent Application No. 2010-193531, filed Aug. 31, 2010, which is incorporated herein by reference.

FIELD OF TECHNOLOGY

The present invention relates to a radio communication system having a tree structure.

BACKGROUND OF THE INVENTION

Recent years have seen increasing use of systems that use wireless communication to perform environmental measurements, monitoring, control, and the like. In wireless communication systems that perform environmental measurements, monitoring, control, and like, often the areas involved are relatively large, and often there are many obstructions to wireless communication within those areas, such cases it is beneficial to use a wireless communication network able to perform communication relayed by other devices to enable coverage within the area even when direct communication is not possible due to the environment, such as the installation locations of the receiving device and the transmitting device, the state of radio signals, and the like.

For this type of wireless communication network, one may consider a wireless communication network and that uses the ZigBee™ protocol (See, for example, Japanese Unexamined Patent Application Publication 2006-5928 and Japanese Unexamined Patent Application Publication 2006-42370). In the below, a wireless communication network that uses the protocol will be termed a "ZigBee network."

A ZigBee network is a wireless communication network with a tree structure and is structured from the following three types of devices:

Device A (Node A)

There is only a single base layer (highest-level layer), known as the "coordinator," which connects and communicates with lower-level devices. Moreover, this not only fulfills the role of the overall master station for the network as a whole, but also assigns the communication addresses (the network addresses) to the devices that are connected in a master/slave connection relationship (hereinafter termed simply a "master/slave relationship).

Device B (Node B)

Known as a "router," this is on a level that is below that of the coordinator, and not only can connect and communicate with higher-level devices and lower-level devices, and receives commands from the coordinator, but also can connect to lower-level devices (routers and end devices) to fulfill a role as a local master station for those devices. Moreover, it assigns communication addresses (network addresses) to the devices connected in a master/slave relationship thereto. For example, a VAV controller, or the like, in an air conditioner controlling system would be a router.

Device C (Node C)

This is termed an "end device," and exists at the terminus (the lowest level) of a branch on a network, and can connect and communicate with a higher-level device (a master device) that is connected in a master/slave relationship, but does not become a master station for any other device. For example, in an air conditioner controlling system, a sensor, such as a temperature sensor or a humidity sensor, would be an end device.

In this ZigBee network, when an end device sends a message to a higher-level device (a router or the coordinator), as the destination device, when that device is other than the master device (which would be a router) of that end device, then the transition of that message to the most appropriate router is performed through the master device, for example, performing a search for a route to the destination device.

Specifically, the router that is the most appropriate under the current radio signal conditions is selected from the mesh structure by the master device, through the specification of a route search when a message is transmitted from an end device, to thereby transmit the message. This makes it possible to relay the communication by searching for another communication route when one communication route becomes unusable for communication due to the effects of radio signal variability, such as multipath phasing.

Because of this, message transmission will not be cut off part way through during the outbound trip route from the end device to the destination device. Note multipath phasing is a phenomenon wherein the radio waves that are received are canceled out through phase differences that are produced between multiple communication radio signal reflection paths, preventing reception.

However, in the inbound path from the destination device to the end device, the return transmission destination is the end device, making it impossible to perform, at the destination device, a search for the route to the end device. Because of this, conventionally the transmission of a message back to the end device from the destination device is performed following the same route based on the tree route information for the communication address, where sometimes the message transmission is interrupted in process because of the state of the radio signals.

The present invention was created in order to solve this type of problem, and the object thereof is to provide a wireless communication system able to transmit reliably a message back from a destination device to an end device.

SUMMARY OF THE INVENTION

In order to achieve the object set forth above, the present invention is a wireless communication system of a tree structure having an end device that is located on a lowest level, a master device, located at a higher level than the end device, and that has a master/slave connection relationship with the end device, and a destination device that ultimately receives a message that is sent from the end device through the master device, where the end device includes message transmitting means for transmitting, to the master device, a message that includes at least its own communication address as a transmission origin address, a communication address of a destination device as an address for the ultimate transmission destination, proxy communication request information as information for whether or not to perform proxy communication, and route search request information as information for whether or not to perform a route search. The master device includes message receiving means for receiving a message from the end device; round-trip (outbound and inbound) route search executing means for executing a search for a round-trip route from that device to the destination device when the route search request information included in the message received from the end device indicates that a route search is to be executed; and proxy message transmitting and processing means for storing, as proxy information when the proxy communication request information included in the message received from the end device indicates that proxy communication is to be performed, a pair of the transmission origin address and the ultimate transmission destination address that is included in the message, and also for overwriting the address of the transmission origin included in the message with its own communication address, to be a proxy message to the destination device, and for then sending this proxy message to the device of the next transmission destination following the outbound route that has been searched.

Furthermore, in the present invention, preferably: the destination device has message return transmitting and processing means for sending hack a message including, at least, its own communication address as a return transmission origin address and the communication address of the master device as the ultimate return transmission destination address, to the device of the next transmission destination following the inbound route that has been searched by the master device, when a proxy message has been received from the master device. The master device has proxy information checking means for checking whether or not there exists, as an ultimate transmission destination address in the proxy information, an address matching a return transmission origin address included in the message when a message has been received from the destination device; proxy communication resolving means for reading out the transmission origin address in the proxy information that has been stored in a pair with the matching address, when it has been confirmed by the proxy information checking means that there exists, in the proxy information, a matching address, and for overwriting, with the transmission origin address that has been read out, the return transmission destination address included in the message from the destination device, and also for deleting the proxy information used at that time; and message return transmitting means for sending back, to the end device, the message from the destination device that has been overwritten by the proxy communication resolving means.

In the present invention, the end device sends, to a master device, a message containing at least: the address of the transmission origin (the communication address of the end device), the address of the ultimate destination (the communication address of the destination device), information as to whether or not to perform proxy communication (proxy communication request information), and information as to whether or not to perform route searching (route search request information).

When the master device receives the message from the end device and the route search request information that is included in the received message indicates that route searching is to be performed (for example, if the route search request bit is 1), the master device performs a search for a round-trip (outbound and inbound) route to the destination device. Moreover, when the proxy communication request information included in the received message indicates that proxy communication is to be performed (for example, when the proxy communication request bit is 1), then the master device stores, as proxy information, a pair that is the address of the communication origin (the communication address of the end device) and the address of the ultimate communication destination (the communication address of the destination device) that is included in the message, and overwrites with its own communication address (the communication address of the master device) the address of the transmission origin (the communication address of the end device) that is included in the message, to form a proxy message to the destination device, and then sends this proxy message to the device of the next transmission destination following the outbound route that has been searched.

In the present invention, upon receipt of a proxy message from a master device, the destination device sends back, to the next transmission destination along an inbound route that has been searched by the master device, a message including at least the address of the return transmission origin (its own communication address) and the address of the ultimate return transmission destination (the communication address of a master device (the address of the transmission origin that is included in the proxy message)).

Moreover, upon receipt of a message from the destination device, the master device checks whether or not an address that matches the address of the return transmission origin (the communication address of the destination device) that is included in the message exists, in the proxy information, as an ultimate transmission destination address. Here if it is confirmed that a matching address does exist, then the address of the transmission origin in the proxy information that is stored paired with the matching address is read out, and the address of the return transmission destination that is included in the message from the destination device is overwritten with the address of the transmission origin that was read out. That is, the communication address of the end device is read out and the address of the return transmission destination that is included in the message from the destination device is overwritten with the communication address of the end device. At this time, the master device erases the proxy information that was used at this time (the pair that is the communication address of the end device and communication address of the destination device. The message from the destination device is then sent back to the end device (the device of the transmission origin).

Given the present invention, in the master device the pair that is address of the transmission origin (the communication address of the end device) and the address of the ultimate transmission destination (the communication address of the destination device), included in the message from the end device, are stored as proxy information, and not only is the address of the transmission origin that is included in the message (the communication address of the end device) overwritten with the communication address of the master device (the communication address of the master device) to form a proxy message to the destination device, but also the search for the round-trip (outbound and inbound) route is performed prior to the transmission of the proxy message, so that, in the master device, a proxy message is sent from the master device addressed to the destination device following the outbound route that has been searched by the master device and then, at the destination device that has the proxy message, a message is sent back, addressed to the master device, from the destination device following the inbound route that was searched by the master device, where this message that is sent back is sent back to the end device from the master device using the proxy information, thereby making it possible for the message from the destination device to be sent back reliably to the end device.

DETAILED DESCRIPTION OF THE PRESENT INVENTION

Examples according to the present invention are explained below in detail, based on the drawings.

Figure 1:
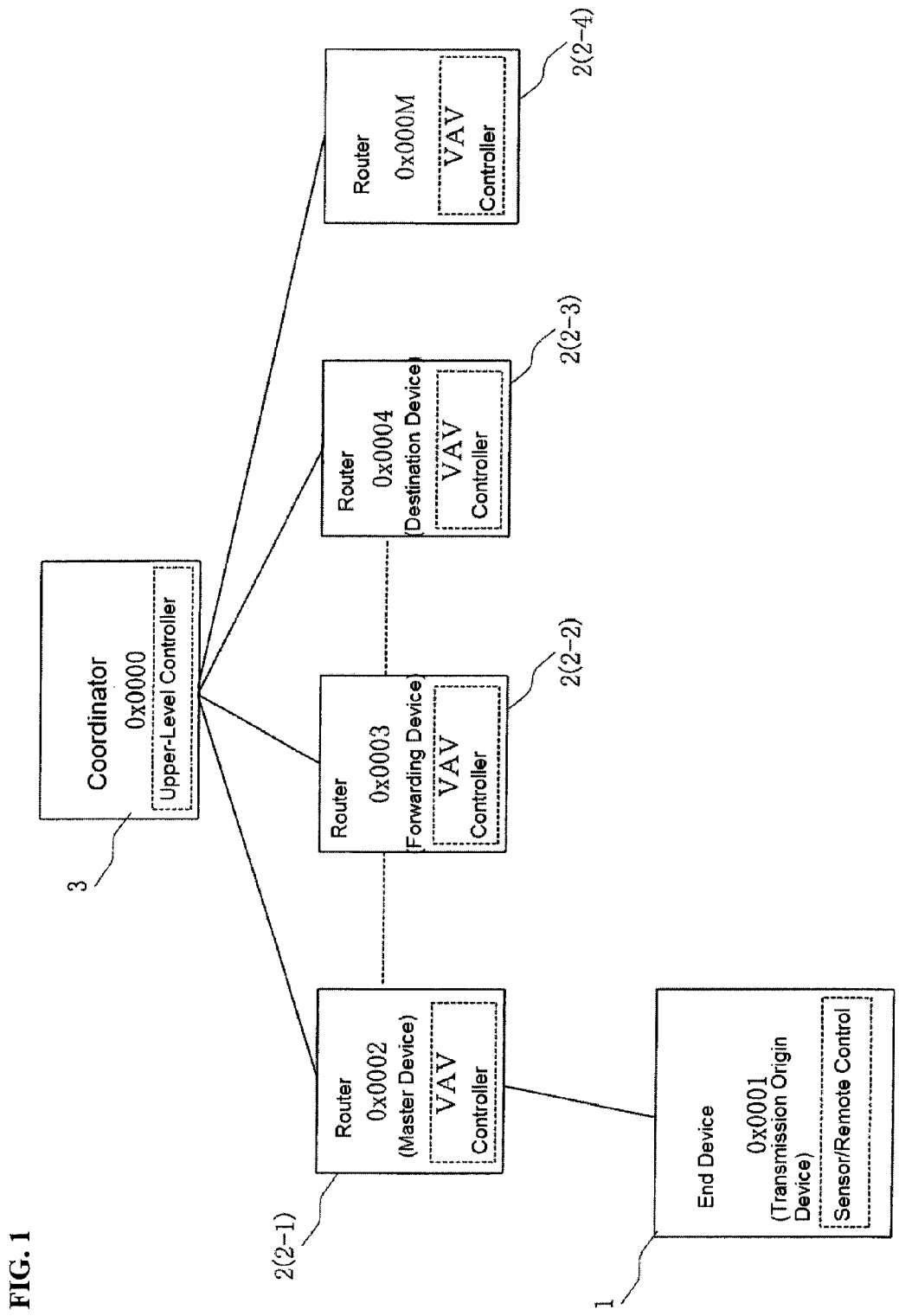
FIG. 1 is a diagram illustrating the critical portions of a ZigBee network that is configured as an example according to the wireless communication system according to the present invention.

FIG. 1 is a diagram illustrating portions of a ZigBee network that is configured as an example according to the wireless communication system. In this figure: 1 is an end device that is located on the lowest level; 2-1 is a router (a master device) that is located at a higher level than the end device 1 and that has a master/slave connection relationship with the end device 1; 2-2 to 2-4 are other routers that do not have a master/slave connection relationship with the end device 1; and 3 is the coordinator.

In this ZigBee network, the communication address of the end device 1 is defined as 0x0001, the communication address of the master device 2-1 is defined as 0x0002, the communication addresses of the routers 2-2, 2-3, and 2-4 are defined as 0x0003, 0x0004, and 0x000M, and the communication address of the coordinator 3 is defined as 0x0000.

Additionally, in this ZigBee network, the transmission destination for the message from the end device 1 is defined as the router 2-3. That is, when the end device 1 is defined as the transmission origin device, the ultimate transmission destination (the destination) of the message from this transmission origin device is the router 2-3. In the below, the router 2-3 will be termed the "destination device."

In the present example, the end device 1 is a sensor or a remote control, where the routers 2 (2-1 through 2-4) are VAV controllers (variable air volume controllers), and the coordinator is a higher-level controller. In this case, the destination device 2-3 receives a sensor measurement value, or the like, from the end device 1, to control the air supply rate of conditioned air to an air-conditioning-controlled area.

Transmission of a Message from the End Device to the Destination Device (Outbound Route)

Figure 2:
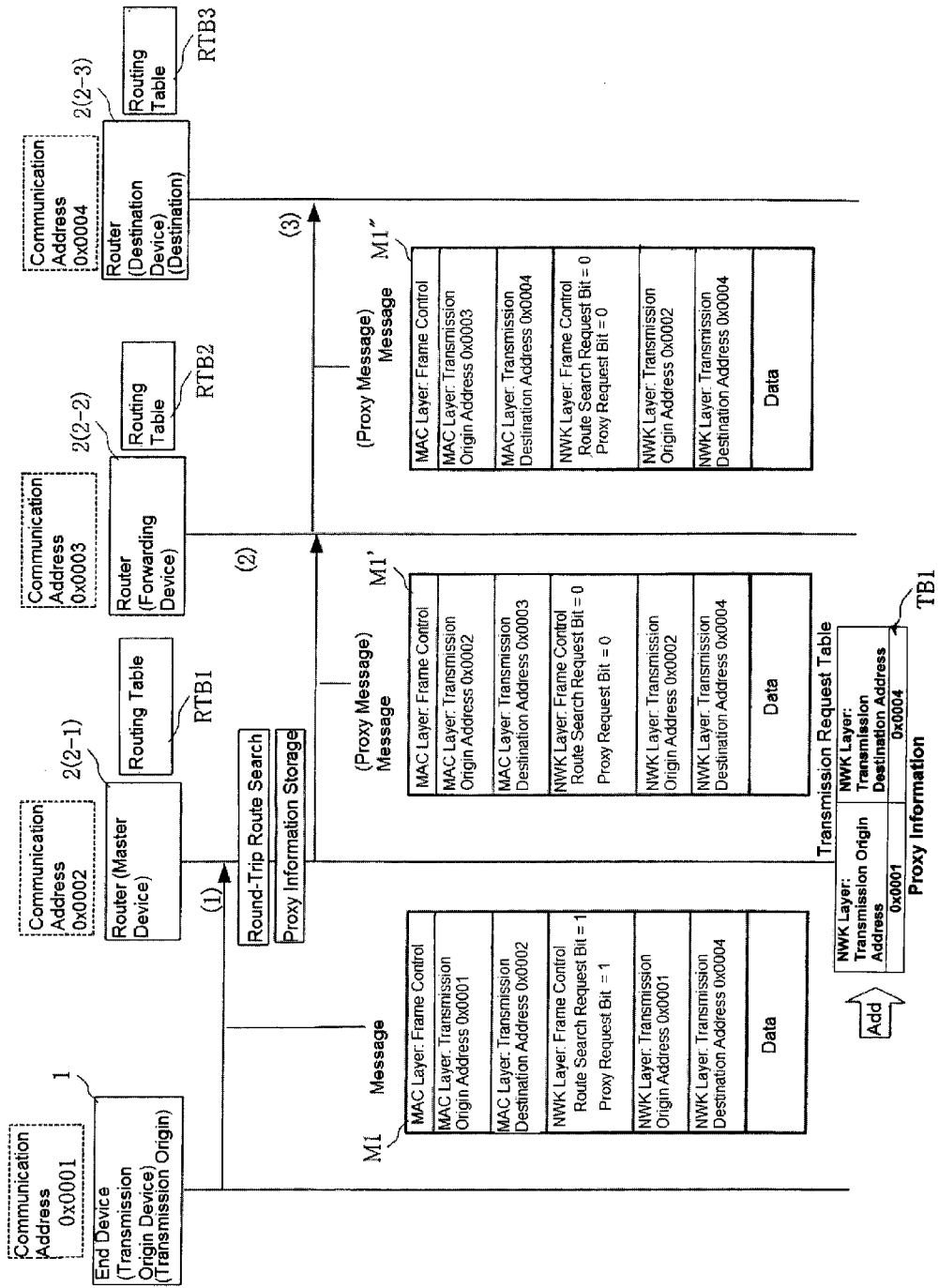
FIG. 2 is a sequence diagram for when sending a message from an end device to the destination device in the ZigBee network.

FIG. 2 shows a sequence diagram for when sending a message from the end device 1 to the destination device 2-3. The case wherein a message from the end device 1 is sent to the destination device 2-3 will be explained below in reference to this sequence diagram.

End Device (Transmission Origin)

The end device 1, when sending a message 1 that includes data, writes its own communication address 0x0001 to the MAC layer transmission origin address in the message M1, the communication address 0x0002 of the master device 2-1 to the MAC layer transmission destination address in the message M1, its own communication address 0x0001 to the NWK layer transmission origin address in the message M1, and the communication address 0x0004 of the destination device 2-3 in the NWK layer transmission destination address in the message M1. Note that in the message M1 the MAC layer transmission destination address indicates the address of the next transmission destination and the NWK layer transmission destination address indicates the address of the ultimate transmission destination (the destination).

Additionally, the end device 1 sets the NWK layer frame control proxy communication request bit in the message M1 to 1, and sets the route search request bit in the message M1 to 1. Note that while the proxy communication request bit is set to 1 each time a message M1 is transmitted, the route search request bit is set to 1 only at the time of the initial transmission or when there is a retry transmission when the application layer has detected a timeout in bidirectional communication.

Following this, the end device 1 sends this message M1 to the master device 2-1 (FIG. 2: Arrow (1))

Master Device

Upon receipt of the message M1 from the end device 1, the master device 2-1 checks the NWK layer frame control in this message M1. Here, if the route search request bit is 1 in the NWK layer frame control, then the communication address 0x0004 of the destination device 2-3 is obtained from the NWK layer transmission destination address, and a round-trip (outbound and inbound) route from that device to the destination device 2-3 is searched. As a result, routing tables RTB1 through 3 that determine the round-trip route from the master device 2-1 to the destination device 2-3 are produced within each of the devices. Following this, the master device 2-1, after executing the search for the round-trip route, clears the route search request bit in the NWK layer frame control to 0. Note that in this example the outbound route is produced as follows: router 2-1 (master device)→router 2-2 (forwarding device)→router 2-3 (destination device). Moreover, the inbound route is produced as router 2-3 (destination device) →router 2-2 (forwarding device)→router 2-1 (master device).

Moreover, if the proxy communication request bit is set to 1 in the NWK layer frame control in the message M1, then the master device 2-1 reads in the NWK layer transmission origin address and the NWK layer transmission destination address, and stores (sets), in the transmission request table TB1, as the proxy information, this pair of NWK layer transmission origin address and NWK layer transmission destination address that has been read in. In this case, the NWK layer transmission origin address in the message M1 is defined as the communication address 0x0001 of the end device 1, and the NWK layer transmission destination address is defined as the communication address 0x0004 of the destination device 2-3, and thus this pair of communication addresses 0x0001 and 0x0004 is recorded, as the proxy information, in the transmission request table TB1. This transmission request table TB is 1 is stored in the memory of the master device 2-1.

Furthermore, after the proxy information is stored in the transmission request table TB1, the master device 2-1 overwrites the NWK transmission origin address in the message M1 with its own address. In this case, the NWK layer transmission origin address is set to the communication address 0x0001 of the end device 1, and thus the communication address 0x0001 is overwritten with the communication address 0x0002 of the master device 2-1. Following this, the master device 2-1 clears to 0 the proxy communication request bit in the NWK layer frame controller.

Next the master device 2-1 obtains, from the routing table RTB1, the communication address of the device that is the next transmission destination (the next forwarding address), and overwrites the MAC layer transition destination address with the next forwarding address. In this case, the forwarding address is obtained as the communication address 0x0003 of the router 2-2, and thus the MAC layer transmission destination address is overwritten to 0x0003. Furthermore, in conjunction with this, the MAC layer transmission origin address is overwritten with the local address, that is, with the communication address 0x0002 of the master device 2-1.

After this, the master device 2-1 defines the overwritten message M1 as a proxy message M1', and sends this proxy message M1' to the router 2-2 that is the device that is the next transmission destination (a forwarding device) (FIG. 2: Arrow (2)). Note that the NWK layer transmission origin address being overwritten with the communication address 0x0002 of the master device 2-4 is a major distinctive feature of the proxy message M1'.

Forwarding Device

Upon receipt of the proxy message M1' from the master device 2-1, the forwarding device 2-2 checks the NWK layer frame control in the proxy message M1'. In this case, the proxy communication request bit is set to 0 in the NWK layer frame control, and thus the communication address of the next transmission destination device (the next forwarding device) is obtained from the routing table RTB2, without performing proxy communication, and the MAC layer transmission destination address is overwritten with the next communication address. In this case, the forwarding address is obtained as the communication address 0x0004 of the router 2-3, and thus the MAC layer transmission destination address is overwritten to 0x0004, Furthermore, in conjunction with this, the MAC layer transmission origin address is overwritten with the local address, that is, with the communication address 0x0003 of the forwarding device 2-2.

In addition to this, the transmission device 2-2 defines this overwritten proxy message MF as a proxy message M1" and sends it to the router 2-3 (the destination device) that is the next transmission destination device (FIG. 2: Arrow (3)), Note that the NWK layer transmission origin address in the proxy message M1" is still the communication address 0x0002 of the master device 2-4.

Destination Device (Transmission Destination)

Upon receipt of the proxy message M1" from the forwarding device 2-2, the destination device 2-3 processes the proxy message M1" that has been received.

Return Transmission of the Message from the Destination Device to the End Device (Inbound Route)

Figure 3:
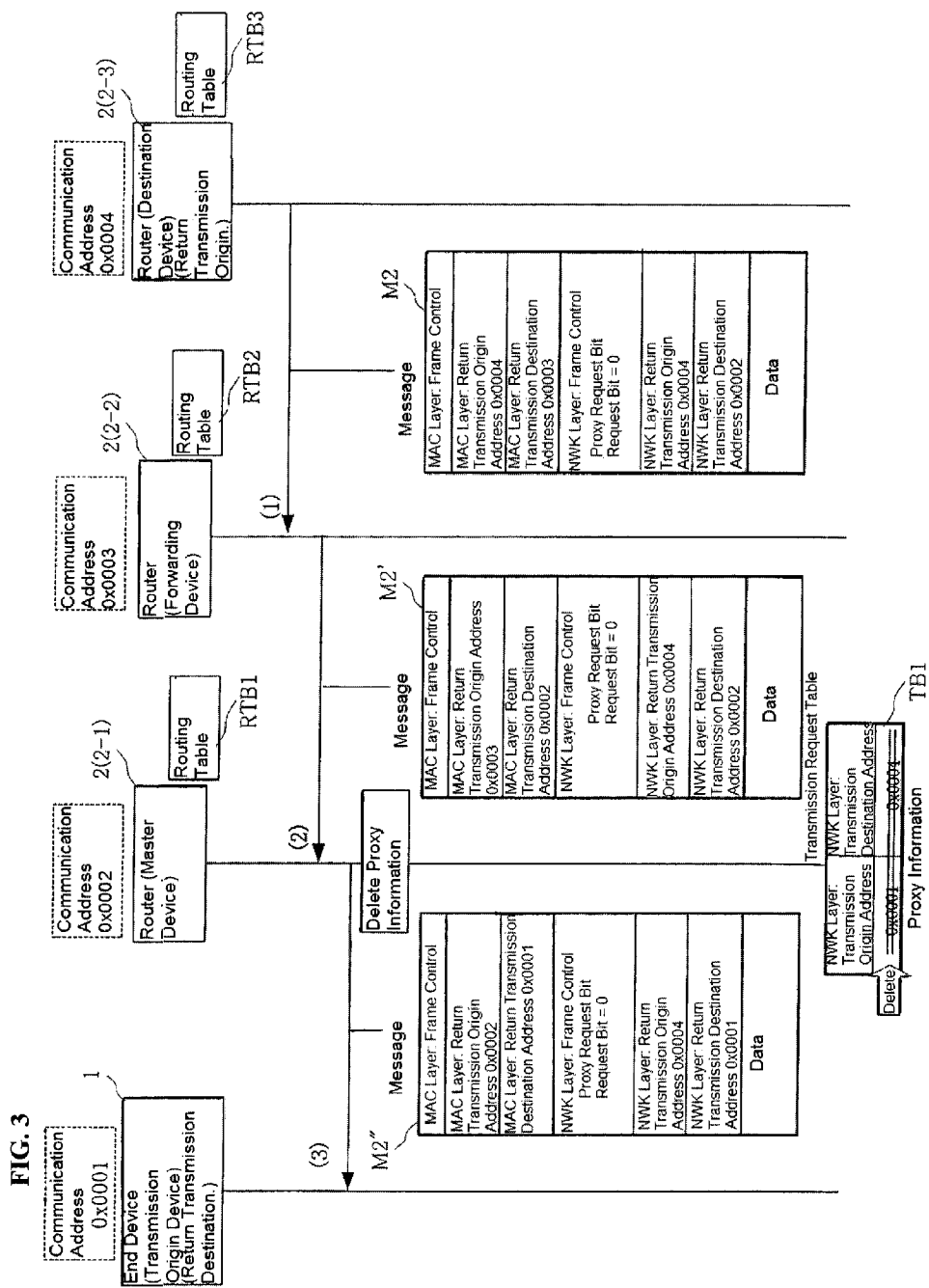
FIG. 3 is a sequence diagram for when sending a message back from the destination device from the end device in the ZigBee network.

FIG. 3 shows a sequence diagram for when returning a message to the end device 1 from the destination device 2-3. The case wherein a message is sent to the end device 1 from the destination device 2-3 will be explained below in reference to the system diagram.

Destination Device (Return Transmission Origin)

Upon receipt of the proxy message M1" (shown in FIG. 2) from the forwarding device 2-2, the destination device 2-3 obtains the communication address 0x0002 of the master device 2-1 from the NWK layer transmission origin address in the proxy message M1".

The destination device 2-3, at the time of returning a message M2, which includes data, writes its own communication address 0x0004 to the MAC layer return transmission origin address in the message M2, and writes, to the MAC layer return transmission destination address, the communication address 0x0003 of the router 2-2 that is obtained from the routing table RTB3, as the communication address for the next return transmission destination (the next forwarding address). Moreover, it writes its own communication address 0x0004 to the NWK layer return transmission origin address, and writes the communication address 0x0002 of the master device 2-1 to the NWK layer return transmission destination address. Furthermore, it clears the NWK layer frame control proxy communication request bit to 0.

Following this, the destination device 2-3 sends this message M2 back to the router 2-2 that is the device that is the next return transmission destination (a forwarding device). (FIG. 3: Arrow (1))

Forwarding Device

Upon receipt of this message M2 from the destination device 2-3, the forwarding device 2-2 checks the NWK layer frame control in the message M2. In this case, the proxy communication request bit is set to 0 in the NWK layer frame control, and thus the communication address of the next return transmission destination device (the next forwarding device) is obtained from the routing table RTB2, without performing proxy communication, and the MAC layer return transmission destination address is overwritten with the next communication address. In this case, the forwarding address is obtained as the communication address 0x0002 of the router 2-1, and thus the MAC layer return transmission destination address is overwritten to 0x0002. Furthermore, in conjunction with this, the MAC layer return transmission origin address is overwritten with the local address, that is, with the communication address 0x0003 of the forwarding device 2-2.

In addition to this, the transmission device 2-2 defines this overwritten message M2 as a proxy message M2' and sends it to the router 2-1 (the master device) that is the next return transmission destination device (FIG. 3: Arrow (2)). Note that the NWK layer return transmission origin address in the message M2' is still the communication address 0x0002 of the master device 2-4.

Master Device

Upon receipt of the message M2 from the forwarding device 2-2, the master device 2-1 checks whether or not there is an address that matches the NWK layer return transmission origin address in the message M2' as an NWK layer transmission destination address in the transmission request table TB1. In this case, the return transmission origin address in the NWK layer in the message M2' is 0x0004, and the NWK layer transmission origin address that is stored in the transmission request table TB1 is 0x0004, and so there is a matching address in the transmission request table TB1.

Upon confirmation that there is a matching address in the transmission request table TB1, the master device 2-1 reads out the NWK layer transmission origin address that is stored as a pair with the matching address, and not only overwrites the NWK layer return transmission destination address in the message M2' with the NWK layer transmission origin address that has been read out, but also deletes the proxy information in the transmission request table TB1 that was used at that time (the pair of the NWK layer transmission origin address and transmission destination address).

In this case, the NWK layer transmission origin address recorded as a pair with 0x0004 in the transmission request table TB1 is 0x0001, and thus the NWK layer return transmission destination address 0x0002 in the message M2' is overwritten to 0x0001. After this, the NWK layer transmission origin address and transmission destination address 0x0004 that are stored in the transmission request table TB1 are deleted.

Additionally, the master device 2-1 overwrites the MAC layer return transmission destination address in the message M2' to 0x0001, and, together with this, overwrites the MAC layer return transmission origin address to its own address, that is, to the communication address 0x0002 of the master device 2-1.

Additionally, the master device 2-1 defines this overwritten message M2' as a message M2", and sends it back to the end device 1 (FIG. 3: Arrow (3)).

Note that if in the transmission request table TB1, there is no NWK layer transmission destination address that matches the NWK layer return transmission origin address in the message M2', then the master device 2-1 processes the message M2' as a message to its own address.

End Device (Return Transmission Destination)

Upon receipt of the message M2" from the master device 2-1, the end device processes this received message M2" that has been received.

Prohibition of Exchange of Their Own Messages between Routers

As communications on ZigBee networks, one may consider communications between end devices and end devices, between end devices and routers, between end devices and coordinators, between routers and routers, and between routers and coordinators. In this case, if there is a conflict between the proxy communication described above and a communication between one router and another router, it is possible that both communications will fail.

For example, if a proxy communication is performed from the end device 1 to the destination device 2-3 through the master device 2-1, then if after the transmission of a request message to the destination device 2-3 from the master device 2-1, another request message, as a separate communication, were sent from the destination device 2-3 to the master device 2-1, then there would be a risk that the master device 2-1 would interpret the request message from the destination device 2-3 to be the proxy communication response message, and erroneously send the request message to the end device 1.

In order to prevent this type of problem from occurring, there should be the premise that the master device 2-1 and the destination device 2-3 will not exchange their own messages. In this case, for the router 2, any router may become a master device, or may become a destination device. Consequently, in the example set forth above there is the assumption that no two routers will exchange their own messages with each other.

Function Block Diagram

Figure 4:
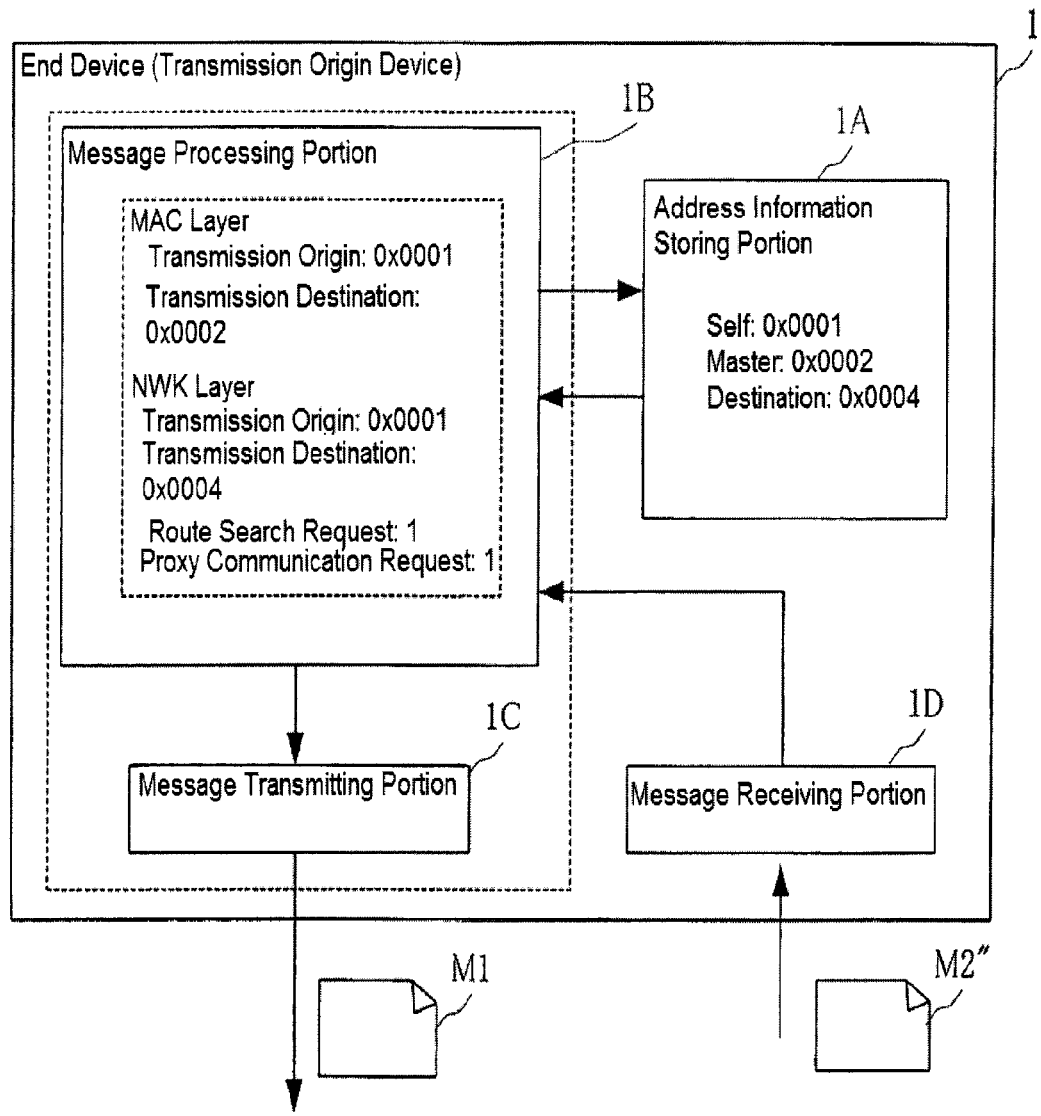
FIG. 4 is a functional block diagram of the critical portions of the end device in the ZigBee network.
Figure 5:
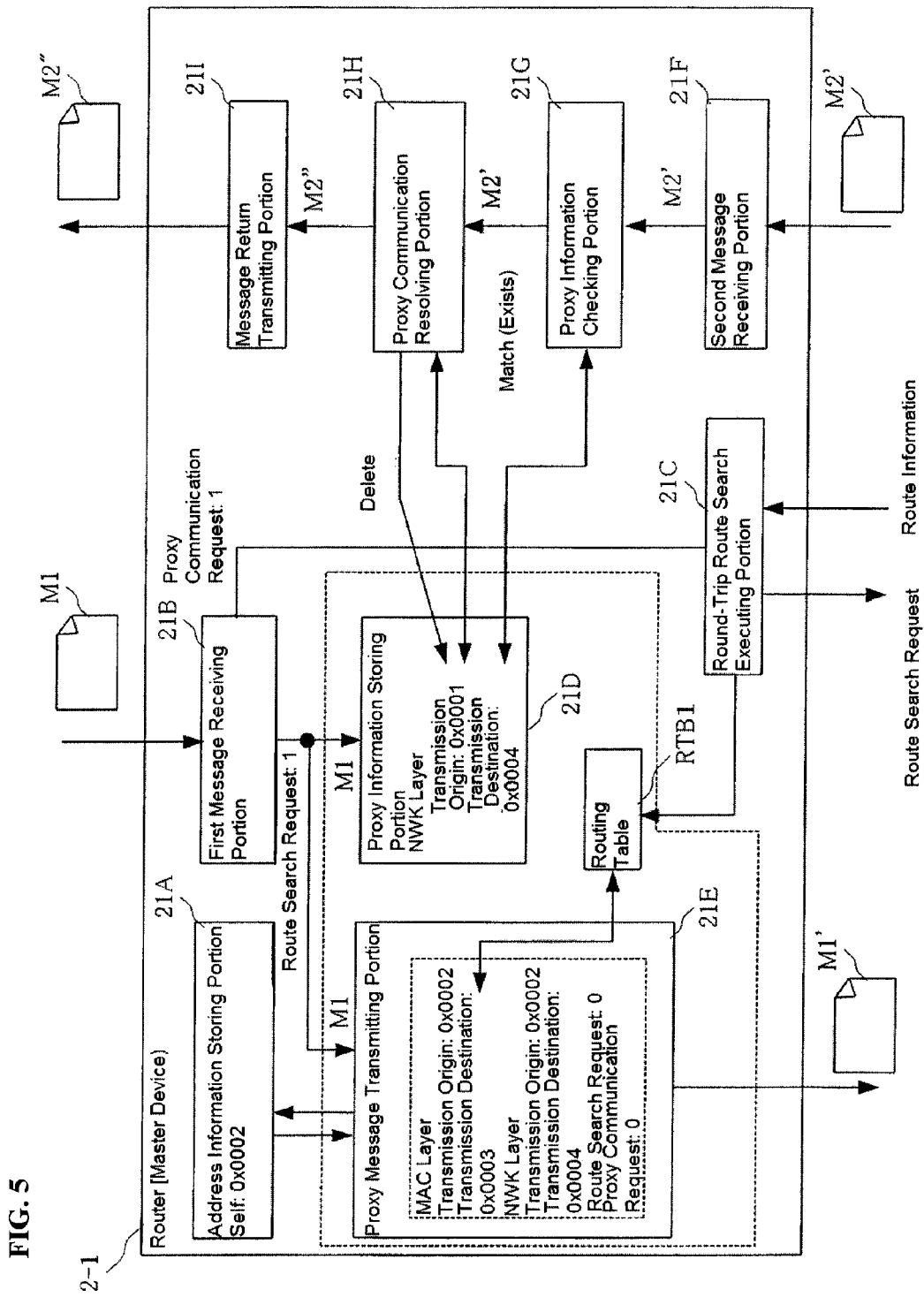
FIG. 5 is a functional block diagram of the critical portions of the master device in the ZigBee network.
Figure 6:
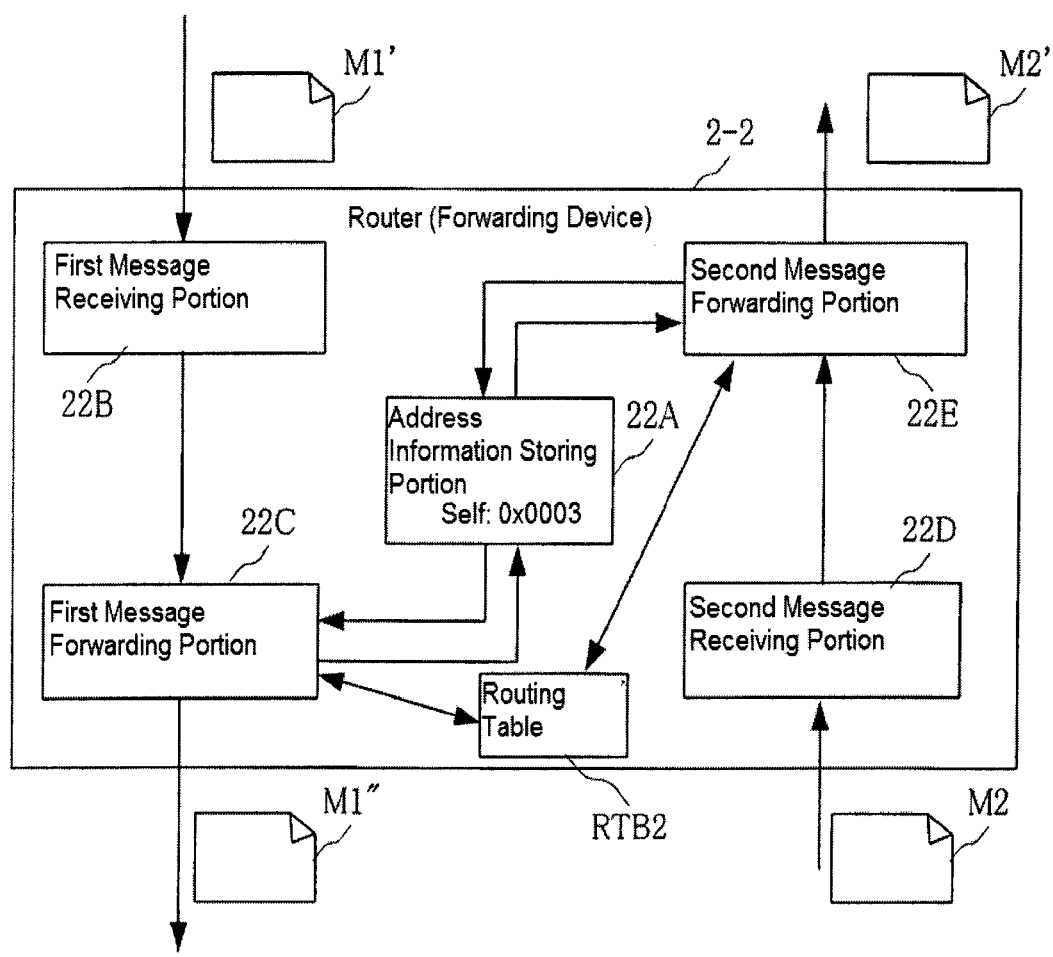
FIG. 6 is a functional block diagram of the critical portions of the forwarding, device in the ZigBee network.
Figure 7:
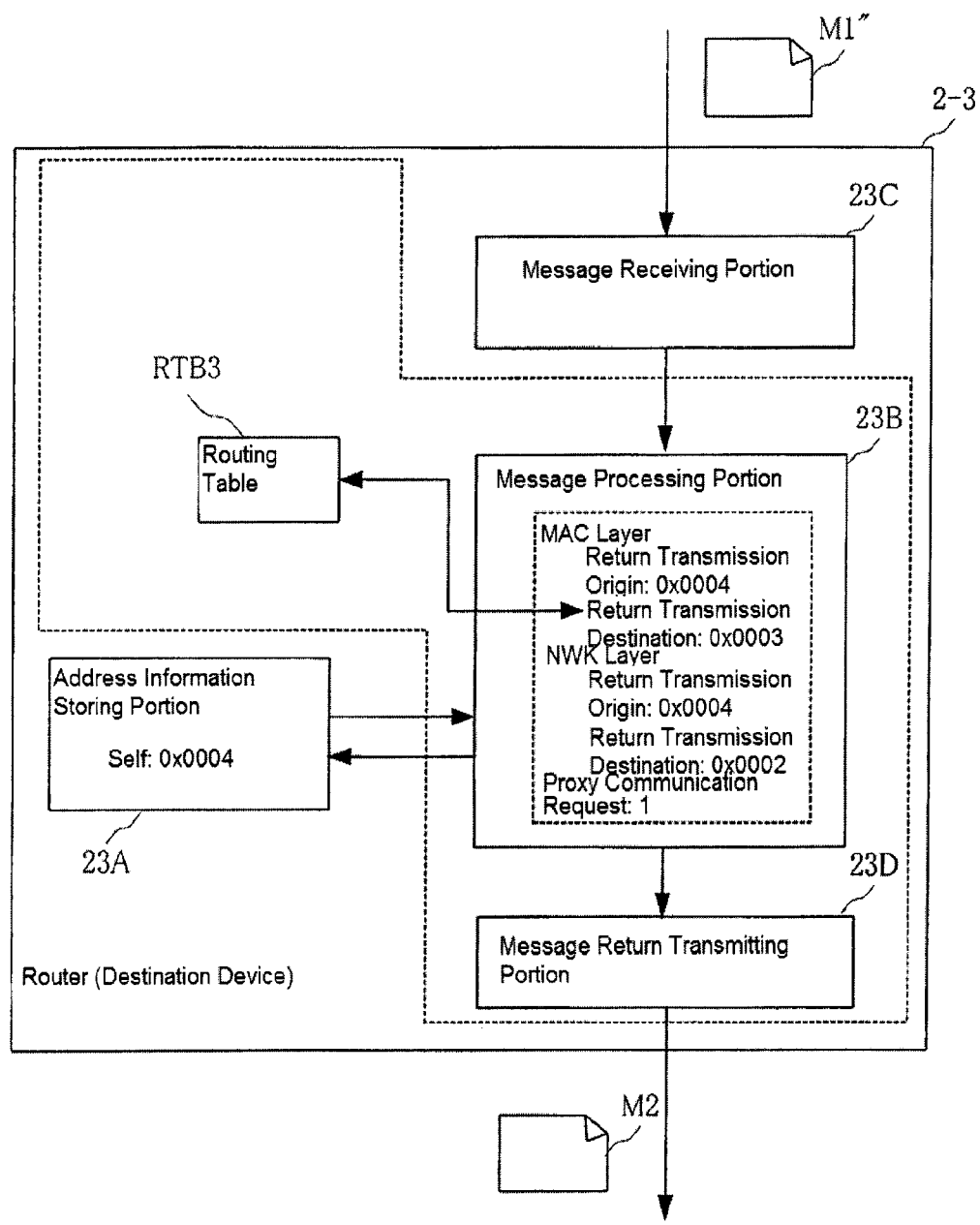
FIG. 7 is a functional block diagram of the critical portions of the destination device in the ZigBee network.

FIG. 4 is a function block diagram of the critical portions of an end device 1 in the ZigBee network set forth above, FIG. 5 is a function block diagram of the critical portions of the master device 2-1, FIG. 6 is a function block diagram of the critical portions of a forwarding device 2-2, and FIG. 7 is a function block diagram of the critical portions of a destination device 2-3. The end device 1, the master device 2-1, the forwarding device 2-2, and the destination device 2-3 are achieved through hardware comprising a processor and a storage device, and through a program to achieve the various types of functions in cooperation with this hardware.

The end device 1 includes an address information storing portion 1A; a message processing portion 1B; a message transmitting portion 1C; and a message receiving portion 1D. The communication address 0x0001 of the end device 1, the local communication address 0x0002 of the master device 2-1, and the communication address 0x0004 of the destination device 2-3 are stored in the address information storing portion 1A.

The master device 2-1 has an address information storing portion 21A; a first message receiving portion 21B; a round-trip route search executing portion 21C; a proxy information storing portion 21D; a proxy message transmitting portion 21E; a second message receiving portion 21F; a proxy information checking portion 21G; a proxy communication resolving portion 21H; and a message return transmitting portion 21I. The local communication address 0x0002 of the master device 2-1 is stored in the address information storing portion 21A.

The forwarding device 2-2 includes an address information storing portion 22A; a first message receiving portion 22B; a first message forwarding portion 22C; a second message receiving portion 22D; and a second message forwarding portion 22E. The local communication address 0x0003 of the forwarding device 2-2 is stored in the address information storing portion 22A.

The destination device 2-3 has an address information storing portion 23A; a message processing portion 23B; a message receiving portion 23C; and a message return transmitting portion 23D. The local communication address 0x0004 of the destination device 2-3 is stored in the address information storing portion 23A.

Transmission of a Message from the End Device to the Destination Device (Outbound Route)

The message processing portion 1B of the end device 1, when sending a message to a destination device 2-3, obtains its own communication address 0x0001, the communication address 0x0002 of the master device, and the communication address 0x0004 of the destination device 2-3 in the address information storing portion 1A, to generate the message M1 (shown in FIG. 2) to the master device 2-1. This message M1 also includes the route search request information (the route search request bit), the proxy communication request information (the proxy communication request bit), and so forth.

This message M1 that has been produced is sent by the message transmitting portion 1C to the master device 2-1. The combination of the message processing portion 1B and the message transmitting portion 1C in the end device 1 corresponds to the message transmitting means in the present invention.

The message M1 from the end device 1 is received by the first message receiving portion 21B of the master device 2-1. When the route search request information included in the message M1 indicates that a route search is to be performed, that is, when the route search request bit is 1, the first message receiving portion 21B directs the round-trip route search executing portion 21C to execute a route search. Upon receipt of this instruction, the round-trip route search executing portion C executes a round-trip route search and routing tables RTB1-3 for determining the route from the master device 2-1 to the destination device 2-3 are produced within each of the devices.

Additionally, when the proxy communication request information that is included in the message M1 indicates that proxy communication is to be performed, that is, when the proxy communication request bit is 1, the first message receiving portion 21B provides notification of this, together with the message M1, to the proxy information storing portion 21D and the proxy message transmitting portion 21E.

The proxy information storing portion 21D, upon receipt of notification from the first message receiving portion 21B that proxy communication is to be performed, stores, as proxy information, the NWK layer transmission origin address (the communication address 0x0001 of the end device 1) and transmission destination (the ultimate transmission destination (destination)) address (the communication address 0x0004) of the destination device 2-3 that are included in the message M1.

The proxy message transmitting portion 21E receives notification from the first message receiving portion 21B that proxy communication is to be performed, and overwrites the NWK layer transmission origin address (the communication address 0x0001 of the end device 1) that is included in the message M1 with its own communication address (the communication address 0x0002 of the master device 2-1). Additionally, it sets the MAC layer transmission origin address to its own communication address, sets the MAC layer transmission destination address to the communication address of the device that is the next transmission destination following the routing table RIB1, and sets the route search request bit and the proxy communication request bit to 0. The message M1 for which this overwriting has been performed is then transmitted, as a proxy message M1' (shown in FIG. 2) to the device of the next transmission destination (the forwarding device 2-2).

In this master device 2-1, the first message receiving portion 21B3 corresponds to the message receiving means in the present invention, the round-trip route search executing portion 21C corresponds to the route search executing means, and the combination of the proxy information storing portion 21D and the proxy message transmitting portion 21E corresponds to the proxy message transmitting/processing means.

The proxy message M1' from the master device 2-1 is received by the first message receiving portion 22B of the forwarding device 2-2, and sent to the first message forwarding portion 22C. The first message forwarding portion 22C sets the MAC layer transmission origin address in the proxy message MF to its own communication address, sets the MAC layer transmission destination address to the communication address of the device of the next communication destination following the routing table RTB2, defines the proxy message M1' wherein the MAC layer transmission origin and transmission destination addresses have been overwritten as M1" (as shown in FIG. 2), and then sends it to the device of the next transmission destination (the destination device 2-3).

The proxy message M1" from the forwarding device 2-2 is received by the message receiving portion 23C of the destination device 2-3, and sent to the message processing portion 23B. The message processing portion 23B processes the proxy message M1" that has been received.

Return Transmission of the Message from the Destination Device to the End Device (Inbound Route)

The message processing portion 23B obtains, from the routing table RTB3, the communication address of the next return transmission destination (the communication address 0x0003 of the forwarding device 2-2), and generates a message M2. The message processing portion 23B sets, in this message M2, its own communication address 0x0004 as the MAC layer return transmission origin address, sets the communication address 0x0003 of the next return transmission destination as the MAC layer return transmission destination address, sets its own communication address 0x0004 as the NWK layer return transmission origin address, and sets the communication address 0x0002 of the master device 2-1 as the NWK layer return transmission destination address. It also sets the proxy communication request bit to 0 (as shown in FIG. 3). The message M2 that has been created is sent back to the forwarding device 2-2 by the message return transmitting portion 23D.

In this destination device 2-3, the combination of the message processing portion 23B and the message return transmitting portion 23D corresponds to the message return transmitting means in the present invention.

The message M2 from the destination device 2-3 is received by the second message receiving portion 22D of the forwarding device 2-2, and sent to the second message forwarding portion 22E. The second message forwarding portion 22E sets the MAC layer return transmission origin address in the message M2 to its own communication address, sets the MAC layer return transmission destination address to the communication address of the device that is the next transmission destination following the routing table RTB2, defines the message M2, wherein the MAC layer transmission origin and transmission destination addresses have been overwritten, to be M2' (as illustrated in FIG. 3), and then sends it to the device of the next return transmission destination (the master device 2-1).

The message M2' from the forwarding device 2-2 is received by the second message receiving portion 21F of the master device 2-1, and sent to the proxy information checking portion 21G. The proxy information checking portion 21G checks as to whether or not there exists, as an NWK layer transmission destination address in the proxy information storing portion 21D, an address that matches the NWK layer return transmission origin address in the message M2', and if one does exist, provides notification of this, together with the message M2', to the proxy communication resolving portion 21H.

The proxy communication resolving portion 21H receives, from the proxy information checking portion 21G, notification of the existence of a matching address, reads out the NWK layer transmission origin address that was stored as a pair with the matching address, overwrites the NWK layer return transmission destination address in the message M2' with the NWK layer transmission origin address that has been read out, and then deletes, from the proxy information storing portion 21D, the NWK layer transmission origin address and transmission destination address pair that has been used at this time. The message M2' that has been overwritten by the proxy communication resolving portion 21H is sent, as a message M2", to the message return transmitting portion 21I, to be sent back to the end device 1.

In this master device 2-1, the proxy information checking portion 21G corresponds to the proxy information checking means, the proxy communication resolving portion 21H corresponds to the proxy communication resolving means, and the message return transmitting portion 21I corresponds to the message return transmitting means.

The message M2" from the master device 1 2-1 is received by the message receiving portion 1D of the end device 1, and is sent to the message processing portion 1B. The message processing portion 1B processes the message M2" that has been received.

Note that when the exchange of messages is cut off in the forwarding device 2-2 or the destination device 2-3, a prescribed error message is transmitted to the master device 2-1, and the master device 2-3 that has received this error message again executes the round-trip route search and restarts the exchange of messages following the routing tables that have been regenerated in each of the devices through this search.

The wireless communication system according to the present invention can be used in a variety of fields, such as midsized and large monitoring and control systems in mesh structures wherein the communication trunk lines are wireless. Specifically, one may consider application to air-conditioning systems within buildings that use VAV (variable air volume regulation).

The invention claimed is:

1. A wireless communication system of a tree structure comprising an end device that is located on a lowest level, a master device, located at a higher level than the end device, and that has a master/slave connection relationship with the end device, and a destination device that ultimately receives a message that is sent from the end device through the master device, wherein the end device comprises:
  a message transmitter transmitting, to the master device, a message that includes at least its own communication address as a transmission origin address, a communication address of a destination device as an address for the ultimate transmission destination, proxy communication request information as information for whether or not to perform proxy communication, and route search request information as information for whether or not to perform a route search;

wherein the master device comprises:
  a message receiver receiving a message from the end device;
  a round-trip (outbound and inbound) route search executing device executing a search for a round-trip route from that device to the destination device when the route search request information included in the message received from the end device indicates that a route search is to be executed; and
  a proxy message transmitting and processing device storing, as proxy information when the proxy communication request information included in the message received from the end device indicates that proxy communication is to be performed, a pair of the transmission origin address and the ultimate transmission destination address that is included in the message, and also for overwriting the address of the transmission origin included in the message with its own communication address, to be a proxy message to the destination device, and then sending this proxy message to the device of the next transmission destination following the outbound route that has been searched.

2. The wireless communication system as set forth in claim 1, wherein the destination device comprises:
  a message return transmitting and processing device sending back a message including, at least, its own communication address as a return transmission origin address and the communication address of the master device as the ultimate return transmission destination address, to the device of the next transmission destination following the inbound route that has been searched by the master device, when a proxy message has been received from the master device; and the master device comprises:
  a proxy information checker checking whether or not there exists, as an ultimate transmission destination address in the proxy information, an address matching a return transmission origin address included in the message when a message has been received from the destination device;
  a proxy communication resolving device reading out the transmission origin address in the proxy information that has been stored in a pair with the matching address, when it has been confirmed by the proxy information checking means that there exists, in the proxy information, a matching address, and for overwriting, with the transmission origin address that has been read out, the return transmission destination address included in the message from the destination device, and also deleting the proxy information used at that time; and
  a message return transmitter sending back, to the end device, the message from the destination device that has been overwritten by the proxy communication resolving device.

3. The wireless communication system as set forth in claim 1, wherein:
  no exchange of their own messages is performed between the master device and the destination device.

\* \* \* \* \*